United States Patent Office

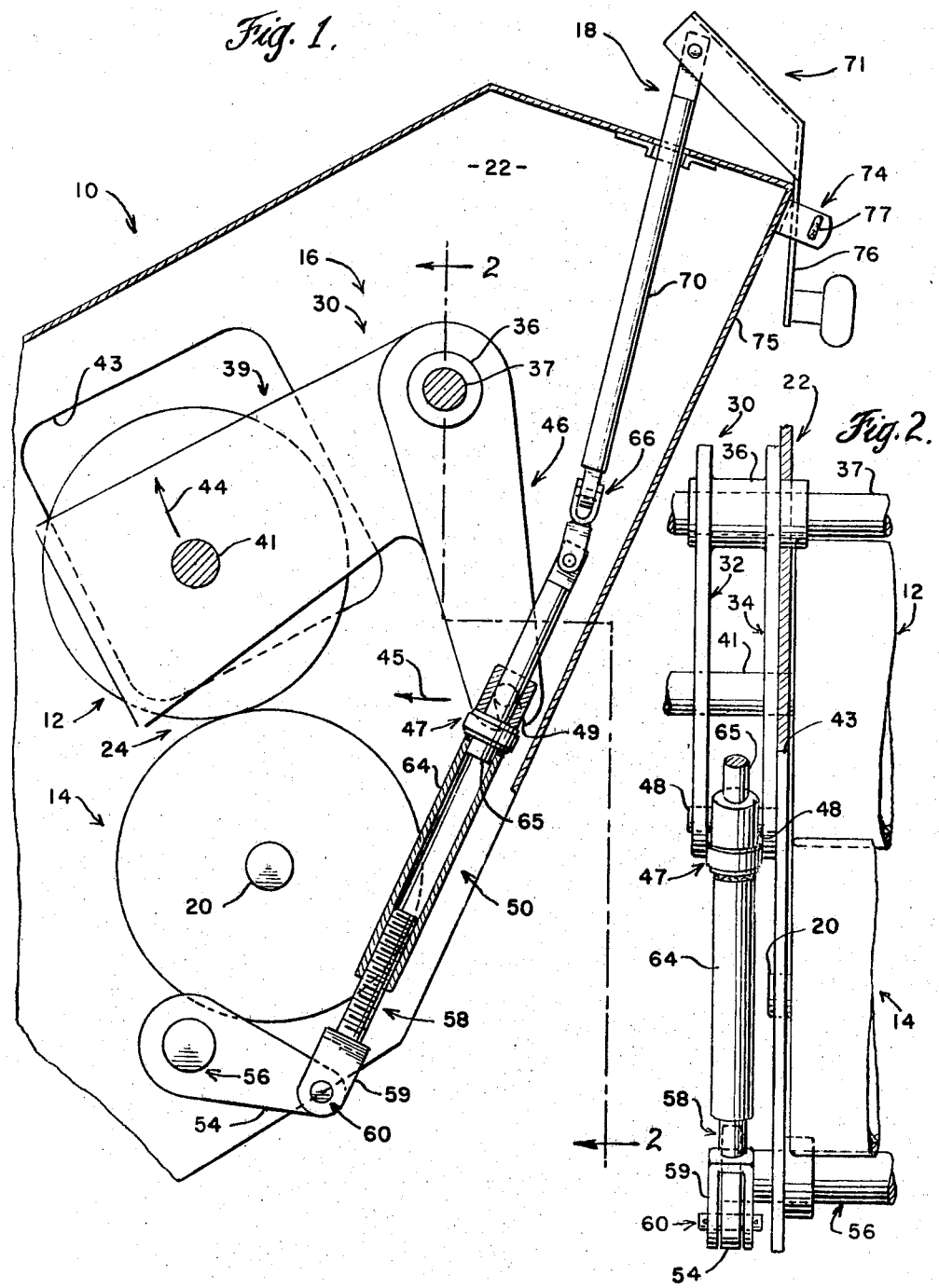

3,505,796
Patented Apr. 14, 1970

3,505,796
CONDITIONER ROLL MOUNTING
Lawrence M. Halls, New Holland, and Henry N. Lausch, Leacock, Pa., assignors to Sperry Rand Corporation, New Holland, Pa., a corporation of Delaware
Filed Nov. 3, 1967, Ser. No. 680,537
Int. Cl. A01d 73/00
U.S. Cl. 56—1     5 Claims

ABSTRACT OF THE DISCLOSURE

An agricultural machine having a pair of cooperating conditioning rolls rotatably supported on the machine frame, with one of the rolls being adapted to move toward and away from the other of the rolls in the event excessive material or a foreign object is passed through the rolls. The movable roll is biased toward the other roll by a torsion bar linked to the movable roll mounting.

BACKGROUND OF THE INVENTION

This invention relates to apparatus for conditioning hay and other forage crops, and more particularly, to hay conditioners of the type which comprises a pair of cooperating rolls between which the hay is passed.

In some hay conditioners of the type under consideration, the lower roll is adapted to pick up crops directly from the ground, and the crop material is discharged rearwardly to windrow shields, or is redeposited on the ground. In another related type of machine, a mower at the forward end of the machine severs standing crop material and the material is delivered to the conditioner rolls by a rotatable reel. In both of these machines, the construction of the conditioner rolls is substantially the same. Normally, a lower roll is journalled in side frame members of the machine for rotation about a generally horizontal axis. An upper roll is carried on a transverse horizontal axis slightly forward of the lower roll, and roll peripheries are in a generally abutting relationship. The upper roll is mounted for movement toward and away from the lower roll to permit foreign objects and heavy loads of crop material to pass through without plugging the machine.

Various mechanisms have been developed to permit movement of the upper roll relative to the lower roll and to bias the upper roll against the lower roll. It is known, for example, to support the upper roll on pivotally mounted arms which permit the upper roll to swing away from the lower roll. The arms are held in an initial position by coil or leaf springs. It has been found desirable to maintain a substantially constant or decreasing hold-down force on the upper roll as the upper roll moves away from the lower roll. If the hold-down force increases as the rolls separate, there is a tendency for the rolls to plug in heavy crop material.

It is known in prior-art devices to provide for a substantially constant or decreasing hold-down force on the rolls. However, the devices developed heretofore have been generally unsatisfactory because of the complicated linkages involved and the use of coil or leaf springs as the biasing means.

SUMMARY OF THE INVENTION

This invention is directed to a novel arrangement for mounting conditioner rolls and for maintaining the desired pressure on the rolls. The lower conditioner roll is rotatably mounted inside frame members of the machines. The upper conditioner roll is rotatably carried in a pair of bell cranks which are pivotally mounted to the side frame members. Each of the bell cranks comprises a first lever arm which rotatably carries an end of the upper roll shaft. A second lever arm extends downwardly from the bell crank pivot point and is connected at its lower end to an adjustable and extensible link. The extensible link is operatively connected to a torsion bar which extends generally parallel to the conditioner rolls. The extensible link comprises an outer tubular member which receives a threaded element connected to the torsion bar. A handle means is provided for manually turning the tube relative to the threaded element to increase or decrease the length of the extensible link, and thereby regulate the pressure on the rolls.

A main object of this invention is to provide a roll mounting means in a conditioner of the character described in which the geometric relationship of the components is such that the biasing force on the rolls decreases when the rolls move apart in response to material passing between the rolls.

Another object of this invention is to provide a roll pressure device of the character described in which a torsion bar is used as the biasing means.

A further object of this invention is to provide an efficient and readily accessible adjustment means for a conditioner roll pressure device.

A still further object of this invention is to provide a roll pressure device of the character described which can be economically manufactured, which is efficient and reliable in operation, which is resistant to plugging, and which is extremely durable and dependable in use.

Other objects of this invention will be apparent hereinafter from the specification and from the recital in the appended claims.

BRIEF DESCRIPTION OF THE DRAWINGS

FIG. 1 is a side elevational view of a conditioning device embodying the features of the invention.

FIG. 2 is a sectional view, taken on the line 2—2 of FIG. 1.

DESCRIPTION OF THE PREFERRED EMBODIMENT

Referring now to the drawings by numerals of reference and particularly to FIG. 1, a conditioning device 10 is shown which comprises an upper roll 12, a lower roll 14, an upper roll mounting means 16, and roll pressure control 18. Rolls 12 and 14 extend across the machine transverse to the direction of travel, and they are adapted to be rotated about a generally horizontal axis. Conditioning device 10 may be used in a hay conditioner of the type which is adapted to process cut crop material, or it may be used in a machine known as a mower-conditioner which both cuts and processes the crop material. A mower-conditioner of the type referred to is shown in the patent to Glass et al. 3,325,981.

Lower roll 14 comprises a center shaft 20 which is journalled in a pair of side frame members, one of which is shown at 22. Roll 14 is adapted to be rotated by a drive means, not shown. The body of lower roll 14 is preferably formed of an elastic or resilient material, and the outer peripheries of rolls 12 and 14 define a crop receiving bight 24.

Upper roll 12 is carried on bell cranks 30 which provide for relative movement between the lower and upper rolls in a transaxial direction. A bell crank 30 is fixed to each of the side frame members 22. Each of the bell cranks is of substantially the same construction, and thus, only one of the bell cranks will be described in detail. Each bell crank 30 is formed from a pair of plate members 32 and 34 which are connected by a cylindrical bushing 36. Bushing 36 is pivotally mounted on a shaft 37 fixed to the machine frame. A first arm 39 of bell crank 30 rotatably supports one end of a shaft 41 in upper roll 12. Shaft 41 extends through an opening 43 in side frame member 22. A second arm 46 of the bell crank extends downwardly from the bell crank pivotal connection, and its lower end is connected to a roll pressure control 18. When material is passed between the rolls, arm 39 moves in the direction of arrow 44, and arm 46 moves as shown by arrow 45.

A roll pressure control 18 is operatively connected to each bell crank 30 and comprises a thrust collar 47 having projections 48 which are received in grooves 49 in the lower end of bell crank arm 46. Collar 47 is slidably mounted on the upper end of an adjustable link 50 which is connected to an element 54 on a torsion bar 56. Torsion bar 56 is journalled in side frame member 22, as shown in FIG. 2, and is fixed against rotative movement at its inner end, not shown. It is understood that there is a torsion bar 56 for each roll pressure control 18.

Adjustable link 50 comprises a threaded member 58 having a bifurcated end portion 59 which is pinned to element 54 at 60. A tubular member 64 is threaded over member 58, and at its upper end is welded to a rod 65 which is adapted to be rotated to lengthen or shorten link 50, and thereby increase or decrease the pressure on the conditioner rolls 12 and 14. Rod 65 is connected through a U-joint 66 to vertically extending bar 70 having a handle 71 connected to its upper end. A bracket 74 fixed to panel 75 of the conditioner frame is adapted to receive a portion 76 of handle 71 to prevent rotative movement thereof when the desired adjustment on the conditioner rolls has been made. A cotter pin 77 locks handle 71 in bracket 74.

An important feature of this invention is the arrangement of the component parts so that the hold-down force on upper roll 12 decreases as the rolls separate in response to material passing between the rolls. The torsion bars 56 offer an increasing resistance as they are twisted. Thus, if the upper roll 12 were linked directly to the bars 56, the hold-down force would increase as the upper roll 12 moved upwardly. To provide for a decreasing hold-down force, arms 39 and 46 of bell crank 30 have been located so that as upper roll 12 rises, the moment arm of arm 39 increases and the moment arm of arm 46 decreases. The multiplication of forces effected by the bell crank arms 30 more than compensates for the increasing resistance of torsion bars 56 so that the hold-down force on roll 12 decreases as it moves upwardly.

In most operations, an initial pressure is placed on the rolls by turning handle 71 to extend link 50 until torsion bar 56 is placed under stress. Crop material is fed between rolls 12 and 14 by the machine, and the material is discharged rearwardly in a continuous mass. When the material leaves the rolls on the discharge side thereof, it is fed to windrow forming means, or directly to the ground. The amount of material passing through the rolls will vary with different crop conditions. Thus, in normal operation, upper roll 12 will move toward and away from lower roll 14 throughout a certain range. The roll pressure linkage is such that, in this range, the pressure decreases as the roll rises.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention.

Having thus described our invention, what we claim is:

1. A crop treating device comprising:
   frame means comprising axially spaced generally vertically extending side members;
   a first roll journalled in said side members for rotation about a generally horizontal axis;
   a second roll adjacent said first roll, said second roll being rotatable about an axis generally parallel to said horizontal axis;
   support means on said frame members rotatably supporting said second roll for movement toward and away from said first roll;
   biasing means on said frame means and adjacent said rolls for forcing said second roll toward said first roll, said biasing means including torsion means;
   linkage means including a first tubular element connected to said support means and extending to said biasing means, said element being operatively connected to said biasing means; and
   the geometric relationship of said support means and biasing means being such that the force on said second roll in the direction of said first roll decreases as the second roll moves away from said first roll.

2. A crop treating device, as recited in claim 1, wherein said support means comprises a bell crank, said bell crank has a first arm and a second arm and is pivotally connected to a side member adjacent the intersection of said arms, said second roll is journalled in said first arm, and said second arm is connected to said linkage means said first tubular element extending from said second arm, a second element is connected to said torsion bar and threadably received in said tubular element, and handle means is provided to rotate said tubular element to change the effective length of said linkage means and thereby regulate the pressure on said rolls.

3. A crop treating device, as recited in claim 2, wherein said torsion means comprises a torsion bar having one end journalled in said side member and an opposite end fixed against rotative movement.

4. A hay conditioner, as recited in claim 1, wherein said linkage means is adjustable with respect to said support means and said biasing means to regulate the pressure on said rolls, said support means comprising a bell crank having first and second arms, said bell crank being pivotally connected to said frame so that as said second roll moves away from said first roll the moment arm of said first arm increases and the moment arm of said second arm decreases.

5. A hay conditioner, as recited in claim 4, wherein said adjustable linkage means comprises a pair of elements threaded together, and handle means is provided to turn one of the elements relative to the other to adjust the length of the link.

References Cited

UNITED STATES PATENTS 3,006,124 10/1961 Glass et al. _____ 56—1
3,116,582 1/1964 Wathen et al. _____ 56—1
3,339,352 9/1967 Burrough et al. _____ 56—1

ROBERT PESHOCK, Primary Examiner

J. A. OLIFF, Assistant Examiner